United States Patent [19]

Boutni

[11] Patent Number: 4,749,738
[45] Date of Patent: Jun. 7, 1988

[54] POLYCARBONATE COMPOSITIONS EXHIBITING IMPROVED WEAR RESISTANCE

[75] Inventor: Omar M. Boutni, Mt. Vernon, Ind.

[73] Assignee: General Electric Company, Mt. Vernon, Ind.

[21] Appl. No.: 943,464

[22] Filed: Dec. 19, 1986

[51] Int. Cl.⁴ .................... C08K 5/54; C08K 3/34
[52] U.S. Cl. .................. 524/267; 524/269; 524/508
[58] Field of Search ............ 524/267, 269, 508

[56] References Cited

U.S. PATENT DOCUMENTS

| 4,110,299 | 8/1978 | Mark | 524/104 |
|---|---|---|---|
| 4,221,728 | 9/1980 | Jaquiss et al. | 524/267 |
| 4,263,416 | 4/1981 | Liu et al. | 524/267 |
| 4,335,032 | 6/1982 | Rosenquist | 524/269 |
| 4,358,556 | 11/1982 | van Abeelen | 524/267 |
| 4,390,651 | 6/1983 | Brown | 524/267 |
| 4,647,609 | 3/1987 | O'Brien | 524/267 |
| 4,663,374 | 5/1987 | Sonoda | 524/267 |

FOREIGN PATENT DOCUMENTS 60-112834  6/1985  Japan .................. 524/267

Primary Examiner—Lewis T. Jacobs
Attorney, Agent, or Firm—Martin B. Barancik

[57] ABSTRACT

An aromatic carbonate resin composition comprising:
(i) at least one aromatic carbonate resin;
(ii) at least one polyolefin;
(iii) at least one fluorinated polyolefin; and
(iv) at least one silicone fluid;

components (ii)–(iv) being present in amounts which are effective to improve the wear resistance of said aromatic carbonate resin.

41 Claims, No Drawings

POLYCARBONATE COMPOSITIONS EXHIBITING IMPROVED WEAR RESISTANCE

BACKGROUND OF THE INVENTION

The ease and economics of fabricating gears, cams, bearings, slides, ratchets, and the like with injection moldable thermoplastic resins has led to widespread displacement of metals for these applications. In addition to the inherent processing advantages parts made from these thermoplastic materials have the ability to dampen shock and vibration, reduce part weight, run with less power, provide corrosion resistance, and run quietly. Polycarbonate resins, because of their many excellent physical and mechanical properties such as, for example, toughness, flexibility, impact strength, and high heat resistance, are particularly well suited for this purpose. However, polycarbonate resin parts, akin to other thermoplastic resin parts, are subject to greater wear than comparable metal parts when brought into repeated contact with other moving parts fabricated from metal or other thermoplastics.

It would thus be very advantageous if a polycarbonate composition could be provided which, when fabricated into mechanical moving parts, exhibits substantially most of the advantageous propeties of conventional neat polycarbonates and also exhibits improved wear resistance.

Attempts have been made to improve the wear resistance of polycarbonate resins by blending them with various other resins. These attempts have generally not met with unqualified success. This is due to the fact that in order to provide useful polycarbonate blends exhibiting improved wear resistance the material admixed with the polycarbonate resin must not only improve the wear resistance of the polycarbonate resin but must also be compatible with the polycarbonate, i.e., must not adversely affect the properties of the polycarbonate, and must be combinable with the polycarbonate resin in amounts which are effective to improve the wear resistance properties of the aromatic polycarbonate resin.

Thus, for example, while some materials are both compatible with polycarbonate resins and are combinable therewith over a wide range of concentrations they do not positively upgrade the wear resistance of these resins. Indeed, some of these materials adversely affect the wear resistance of polycarbonates. Other materials, while improving the wear resistance of polycarbonates, are not compatible with polycarbonates or are not combinable therewith in amounts which are effective to improve the wear resistance thereof. Still other materials, while being compatible with polycarbonates and combinable therewith over wide concentrations, need to be present in such large amounts in order to positively upgrade the wear resistance of the polycarbonate that they materially change the character of the polycarbonate resin compositions.

Thus, in order to provide a useful polycarbonate composition exhibiting improved wear resistance not only is the nature of the additive material itself critical, but its concentration in the blends is also of great import.

Furthermore, the degree of effectiveness as a wear improving agent varies widely among the materials which are compatible with polycarbonate resins, are combinable therewith in amounts which are effective to positively upgrade the wear resistance of polycarbonate resins, and which positively upgrade or improve the wear resistance of the polycarbonate resins. That is to say, some materials are more effective in positively upgrading the wear resistance of aromatic polycarbonate resins than other materials when admixed with the polycarbonate resin in substantially identical amounts.

There does not appear to be any great degree of predictability or certainty as to how a particular material will function, as regards its ability to improve the wear resistance of polycarbonate resins, when said material is admixed with polycarbonate resins. The empirical approach is thus generally the rule rather than the exception in the area of improving the wear resistance of polycarbonate resins.

SUMMARY OF THE INVENTION

The instant invention is directed to aromatic carbonate resin compositions exhibiting improved wear resistance. More particularly, it is directed to polycarbonate compositions comprising, in physical admixture, (i) at least one aromatic polycarbonate resin, (ii) at least one polyolefin, (iii) at least one fluorinated polyolefin, and (iv) at least one silicone fluid. The polycarbonate resin is present in a major amount while components (ii)–(iv) are present in amounts effective to improve the wear resistance of said polycarbonate resin.

DESCRIPTION OF THE INVENTION

It has been discovered that the wear resistance of parts formulated from aromatic carbonate resin can be improved by admixing with said resin at least one polyolefin, at least one fluorinated polyolefin, and at least one silicone fluid. These parts may be, inter alia, gears, cams, slides, ratchets, and the like which come into contact with other moving parts made from thermoplastic or thermoset resins or metals.

The presence of the silicone fluid in the instant blends is critical to improved wear characteristics since the wear enhancement is achieved with reduced concentrations of the polyolefin and the fluorinated polyolefin components. This is important because the presence of relatively large amounts of polyolefin and fluorinated polyolefin tends to adversely affect some of the advantageous mechanical properties of the polycarbonate.

The polycarbonate resins utilized in the instant invention are conventional well known resins which are generally commercially available or may be readily prepared by well known conventional methods. These polycarbonates, as well as methods for their preparation, are described, inter alia, in U.S. Pat. Nos. 3,161,615; 3,220,973; 3,312,659; 3,312,660; 3,313,777; 3,666,614 and 3,939,672, all of which are incorporated herein by reference. The polycarbonate resins may be conveniently prepared by the interfacial polymerization process by the coreaction of at least one dihydric phenol with a carbonate precursor. Typically, the dihydric phenols utilized may be represented by the general formula

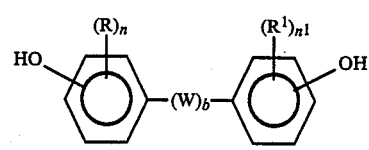

I.

wherein:

R is independently selected from halogen, monovalent hydrocarbon, and monovalent hdyrocarbonoxy radicals;

R¹ is independently selected from halogen, monovalent hydrocarbon, and monovalent hydrocarbonoxy radicals;

W is selected from divalent hydrocarbon radicals,

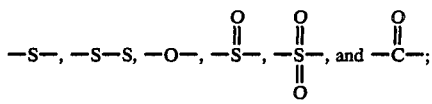

n and n¹ are independently selected from integers having a value of from 0 to 4 inclusive;

and b is either zero or one.

The monovalent hydrocarbon radicals represented by R and R¹ include the alkyl, cycloalkyl, aryl, aralkyl and alkaryl radicals. The preferred alkyl radicals are those containing from 1 to about 12 carbon atoms. The preferred cycloalkyl radicals contain from 4 to about 8 ring carbon atoms. The preferred aryl radicals contain from 6 to 12 ring carbon atoms, i.e., phenyl, naphthyl and biphenyl. The preferred aralkyl and alkarryl radicals contain from 7 to about 14 carbon atoms.

The preferred halogen radicals represented by R and R¹ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those that contain from 6 to 16 ring carbon atoms.

The monovalent hydrocarbonoxy radicals represented by R and R¹ may be represented by the formula —OR² wherein R² is a monovalent hydrocarbon radical of the type described hereinafore. Preferred monovalent hydrocarbonoxy radicals are the alkoxy and aryloxy radicals.

Some illustrative non-limiting examples of dihydric phenols of Formula I include:

2,2-bis(4-hydroxyphenyl)propane (bisphenol-A);
2,2-bis(3,5-dibromo-4-hydroxy-phenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-thiodiphenol; and
bis(4-hydroxyphenyl)ether.

Other dihydric phenols which are useful are described in U.S. Pat. Nos. 2,998,835; 3,028,365 and 3,334,154, all of which are icnorporated herein by reference.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl)carbonates such as di(bromophenyl) carbonate, di(chlorophenyl)carbonate, and di(tribromophenyl)carbonate; di(alkylphenyl) carbonates such as di(tolyl)carbonate; di (naphthyl)carbonate, chlorophenyl chloronaphthyl carbonate; and phenyl tolyl carbonate. The bishaloformates that can be used include the bishaloformates of dihydric phenols such as the bischloroformates of bisphenol-A and hydroquinone; and the bishaloformates of glycols such as the bischloroformates of ethylene glycol, neopentyl glycol. and polyethylene glycol. The preferred carbonate precursor is carbonyl chloride, also known as phosgene.

A convenient process for the preparation of the instant polycarbonates is the interfacial polymerization process. The interfacial polymerization process utilizes two different solvent media which are immiscible. One solvent medium is an aqueous basic medium. The other solvent medium is an organic medium, such as methylene chloride, which is immiscible in said aqueous medium. Also employed in the interfacial polymerization process are molecular weight regulators which control the chain length or molecular weight of the carbonate polymer by a chain terminating mechanism, and catalysts. The molecular weight regulators are well known in the art and include, but are not limited to, phenol itself, p-tertiarybutyl phenol, and chroman-I. The catalysts are also well known in the art and include, but are not limited to, tertiary amines such as triethylamine.

Also included within the term polycarbonates are the randomly branched thermoplastic polycarbonates wherein a branching agent, which is generally a polyfunctional aromatic compound, is reacted with the dihydric phenol and the carbonate precursor. These polyfunctional aromatic compounds contain at least three functional groups which may be carboxyl, hydroxyl, carboxylic anhydride, haloformyl, and mixtures thereof. Some illustrative non-limiting examples of these aromatic polyfunctional compounds that may be employed as branching agents include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

Also included within the scope of the instant invention are the copolyester-carbonate resins. These copolyester-carbonate resins are well known in the art and are described, inter alia, in U.S. Pat. No. 3,169,121, which is hereby incorporated herein by reference. These copolyester-carbonates may be readily prepared by the coreaction of at least one dihydric phenol, at least one carbonate precursor, and at least one ester precursor which may be a difunctional carboxylic acid or an ester forming reactive derivative thereof such as an acid dihalide.

The polycarbonate resin comprises major portions of the instant compositions. The instant blends thus contain at least about 51 weight percent of said polycarbonate resin, and preferably at least about 60 weight percent of said resin.

The polyolefins which form component (ii) of the instant compositions are compounds which are well known in the art and which are generally commercially available. The polyolefins can be homopolymers or copolymers. Preferred polyolefins for use in the instant invention are those which are derived from monomers containing from 2 to about 10 carbon atoms. Some illustrative nonlimiting examples of these polyolefins include polypropylene, polyethylene, polybutylene, polyisobutylene, and ethylenepropylene copolymer.

Methods for the preparation of the polyolefins are abundantly described in the literature and are well known to those skilled in the art. The polyethylene, for example, can be prepared by various procedures using cationic, anionic or free radical initiating catalysts, with conditions varied to produce a range of molecular weights and densities and various degrees of branching or non-branching. In one procedure, which involves free radical initiation, ethylene gas is polymerized in the presence of a peroxide initiating catalyst at a pressure between 15,000 and 40,000 psi and a temperature between 100° and 200° C., to produce a relatively low density polymer, i.e., 0.90 to 0.94 gm/cm³.

The polyethylene can also be prepared by low pressure processes effective to attain a polymer of higher molecular weight and a higher density. In one such procedure, known as the Phillips process, ethylene is contacted in an inert solvent slurry of a catalyst such as chromium oxide supported on silica-aluminum, at pressures of 400 to 500 psig and temperatures of 130° to 170° C., followed by extraction of the polymer with hot solvent and purification, to produce a polyethylene product having a density between 0.96 to 0.97 gm/cm³.

Still other procedures are possible, such as emulsion polymeriztion in aqueous media in the presence of a peroxy compound, as well as suspension polymerization at low temperatures using a silver salt-peroxide redox system.

Also employable as component (ii) is polypropylene, a common commercial form of which is crystalline isotatic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization generally proceeds readily at temperatures between 25° C. and 100° C. to yield a polymer in the form of a slurry of insoluble granular powder.

Copolymers of ethylene and propylene can be prepared using procedures similar to those for polyethylene and other polyolefins; for instance by the polymerization reaction of a mixture of ethylene and propylene in the presence of a Ziegler type catalyst or by free-radical initiation under high pressures.

Polymers based on still higher olefins are not as readily available and, therefore, not as preferred. Examples of such higher polyolefins are polymers based on 2-methyl-1-butene, 1-pentene, 4-methyl-1-pentene, and isobutylene. They can be prepared by known procedures including those described in The Encyclopedia of Polymer Science and Technology, John Wiley & Sons, Inc., Vol. 9, pp. 440–460, 1965, which is incorporated herein by reference.

The linear low density polyolefins may be prepared by state of the art polymerization processes such as those described in U.S. Pat. No. 4,076,698, incorporated herein by reference. The polymers may have a density between 0.89 and 0.96 gm.cc and a controlled concentration of simple side chain branching as opposed to random branching which distinguishes them from polymers such as high pressure low density polyethylene and high density polyethylene. The preferred range of density is from 0.915 to about 0.945 gm/cc. The linear low density polymers such as polyethylene are preferably made from ethylene and alpha olefins of 3 to 8 carbon atoms, e.g., butene-1 and octene-1, or mixtures thereof. The comonomer is used in minor amounts, e.g., 10 mol % or less of the total amount of monomers. A preferred range is about 1-3 mol %. A particularly useful copolymer is made from ethylene and butene, such as for example ESCORENE LPX-15 marketed by EXXON.

The fluorinated polyolefins which comprise component (iii) of the instant compositions are well known compounds which are amply described in the literature and are generally commercially available or may readily be prepared by well known conventional processes. They are normally solids obtained by polymerization of tetrafluoroethylene, for example, in aqueous media with free radical catalysts, e.g., sodium, potassium or ammonium peroxysulfides at 100 to 1,000 psi at temperatures of from about 0° C. to about 200° C., and preferably at temperatures from about 20° C. to about 100° C. The preparation of some of these fluorinated polyolefins is described in U.S. Pat. No. 2,393,967 which is hereby incorporated herein by reference. A particularly useful fluorinated polyolefin is polytetrafluoroethylene. The polytetrafluoroethylene and methods of its preparation are described in Textbook of Polymer Science, edited by Billmeyer, Fred. W., Jr. Interscience Publishers, New York, N.Y., 1962, pp. 419-425, which is incorporated herein by reference. Polytetrafluoroethylene is available commercially from E. I. du Pont de Nemours & Company under the tradename TEFLON.

The fluorinated polyolefin is used in the form of fine particles having an average particle size of from about 0.05 millimicrons to about 0.7mm, preferably from about 0.5 millimicrons to about 0.7 mm.

The silicone fluids which comprise component (iv) of the instant compositions are well known in the art and are generally commercially available or may readily be prepared by known conventional methods. These silicone fluids may be characterized as organopolysioxanes which contain recurring structural units represented by the general formula

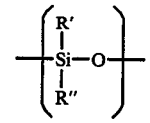

II.

wherein R' and R" are independently selected from hydrogen, alkyl radicals, and aryl radicals. The preferred alkyl radicals are the lower alkyl radicals containing from 1 to about 4 carbon atoms. The preferred aryl radical is the phenyl radical. The organosilicone fluids are described, inter alia, in Eaborn, C. Organosilicon Compounds, Academic Press, New York, N.Y., 1960, which is hereby incorporated herein by reference.

Particularly useful silicone fluids are the phenyl dimethyl polysiloxane fluids and the methyl hydrogen polysiloxane fluids. The methyl hydrogen silicone fluids contain recurring units of Formula II wherein R' is hydrogen and R" is methyl.

The amounts of components (ii)–(iv) present in the instant compositions are amounts which are effective to improve the wear resistance of the polycarbonate resin. Generally, the amount of polyolefin that is present in the instant compositions is from about 1 to about 12 weight percent, preferably from about 2 to about 10 weight percent, and and most preferably from about 3 to about 7 weight percent. The amount of fluorinated polyolefin that is generally present in the instant compositions is generally from about 1 to about 12 weight percent, preferably from about 2 to about 10 weight percent, and most preferably from about 3 to about 7 weight percent. The amount of the silicone fluid that is present in the compositions of the instant invention is generally from about 0.01 to about 1.0 weight percent, preferably from about 0.02 to about 0.8 weight percent, and most preferably from about 0.05 to about 0.5 weight percent. Weight percent of components (i)–(iv) present in the instant compositions is calculated based on the total amounts of components (i)–(iv) present in the composition.

Generally, if less than the minimum specified amounts of components (ii)–(iv) are present in the instant compositions there will be no appreciable or significant improvement in the wear resistance of the polycarbonate resin. If more than the maximum specified amounts of components (ii)–(iv), particularly components (ii) and (iii), are contained in the compositions some of the advantageous mechanical properties of the polycarbonate resin will begin to be substantially deleteriously affected. Thus, the instant compositions contain amounts of components (ii)–(iv) which are effective to improve the wear resistance of the polycarbonate resin but insufficient to substantially deleteriously affect substantially most of the advantageous mechanical and physical properties of the polycarbonate resin.

The presence of component (iv) is critical in that its incorporation into the instant compositions effects an enhancement of the wear resistance at substantially lower concentrations of components (ii) and (iii) than is the case if the silicone fluid were not present. It thus appears that there is an unexpected effect, as regards wear resistance, between the particular components (ii)–(iv). The use of relatively low amounts of components (ii) and (iii), made possible by the presence of the silicone fluid, allows the instant compositions to retain, to a substantial degree, substantially most of the advantageous properties of aromatic polycarbonates. This would not be possible if components (ii) and (iii) were present in relatively large amounts.

Another embodiment of the instant invention is a glass filled polycarbonate composition exhibiting improved wear resistance. The compositions of this embodiment are comprised of, in physical admixture, (i) at least one aromatic carbonate resin, (ii) at least one polyolefin, (iii) at least one fluorinated polyolefin, (iv) at least one silicone fluid, and (v) glass.

The glass is present in the form of glass fibers. By glass fibers it is understood that glass silk as well as all glass fiber materials derived therefrom including but not limited to glass fiber fabrics, roving, staple fibers, and glass fiber mats are included. The length of the glass filaments and whether or not they are bundled into fibers and the fibers bundled into yarns, ropes, or rovings, or woven into mats and the like, is not crucial to the instant invention. However, when using fibrous glass filaments, they may first be formed into a bundle known as a strand. In order to bind the filaments into a strand a binder or binding agent is applied to the glass filaments. This facilitates the handling of the strands. Subsequently the strand can be chopped into various lengths as desired. It is convenient to use strands in lengths of from about ⅛" to about 1" long, preferably less than ¼" in length. These are called chopped strands. Some of the binding agents utilized to bind the filaments into strands are polymers such as polyvinyl acetate, polyester resins, starch, acrylic melamine, polyethylene oxide, and polyvinyl alcohol.

The amount of glass present in the instant compositions can vary from between about 1 to about 40 weight percent, preferably from about 5 to about 35 weight percent, and more preferably from about 10 to about 30 weight percent. Weight percent glass is based on the total amounts of components (i)–(v) present in the instant compositions.

The compositions of the instant invention may also optionally contain the various well known and commonly used additives such as, for example: antioxidants; antistatic agents; ultraviolet radiation screeners such as benzophenone, benzophenone derivatives, benzotriazole, benzotriazole derivatives, and cyanoacrylates; hydrolytic stabilizers such as the epoxides disclosed in U.S. Pat. Nos. 3,489,716, 4,138,379 and 3,839,247; mold release agents; color stabilizers such as the organophosphites disclosed in U.S. Pat. Nos. 3,305,520 and 4,118,370; and flame retardants such as the alkali and alkaline earth metal salts of organic sulfonic acids described, inter alia, in U.S. Pat. Nos. 3,933,734; 3,931,100; 3,987,024; 3,948,851; 3,926,908; 3,919,167; 3,909,490; 4,953,396; 3,953,399; 3,917,559; 3,951,910 and 3,940,366, all of which are incorporated herein by reference. Also optionally present are the well known impact modifiers described, inter alia, in U.S. Pat. No. 4,512,980 to Miller, incorporated by reference.

DESCRIPTION OF THE PREFERRED EMBODIMENT

The following examples are set forth to further illustrate the present invention. These examples are set forth by way of illustration and not limitation. Unless otherwise specified all parts and percentages are on a weight basis.

The following examples illustrate compositions falling outside the scope of the instant invention and are presented for comparative purposes only.

EXAMPLE 1

A polycarbonate resin (comprised of the reaction products of bisphenol-A and phosgene) is injection molded into plaques and these plaques are then machined into test washers measuring about 1.12 inches in diameter and 0.12 inch in thickness.

The wear factor K is determined for these washers. The wear factor K is measured using the Thrust Washer machine, formerly known as LFW-6, which is described in detail in Modern Plastics, Vol. 49, No. 11, page 114 (1972). Briefly stated, this machine utilizes a steel washer which is in rotational contact with a test washer machined from the material to be tested. The applied pressure and the velocity of the rotating steel washer can be varied. In this test the velocity used is 50 ft. per minute and the pressure is 40 psi.

The wear factor is determined in accordance with the following equation:

$$K = \frac{W}{FVT}$$

wherein W represents the volume wear (amount of material by volume removed from the test washer); F represents the force or pressure, in pounds, applied by the steel washer onto the test washer; V represents the rotational velocity in feet per second; and T represents the elapsed time that the two washers are in rotational contact with each other. The lower the K value the better the resistance to wear of the test washer.

The results of this test are set forth in Table I.

EXAMPLE 2

A polycarbonate resin blend containing 20 weight percent glass fibers and 80 weight percent of a polycarbonate resin of Example 1 is injection molded into plaques and these plaques are then machined into test washers measuring about 1.12 inches in diameter and 0.12 inch in thickness. The wear factor K is determined for these washers and the results are set forth in Table I.

EXAMPLE 3

A polycarbonate resin blend containing 20 weight percent glass fibers, 4 weight percent linear low density polyethylene, and 76 weight percent of a polycarbonate resin of Example 1 is injection molded into plaques and these plaques are then machined into test washers measuring about 1.12 inches in diameter and 0.12 inch in thickness. The wear factor K is determined for these washers and the results are set forth in Table I.

EXAMPLE 4

A polycarbonate resin blend containing 20 weight percent glass fibers, 10 weight percent polytetrafluoroethylene, and 70 weight percent of a polycarbonate resin of Example 1 is injection molded into plaques and these plaques are then machined into test washers measuring about 1.12 inches in diameter and 0.12 inch in thickness. The wear factor K is determined for these washers and the results are set forth in Table I.

EXAMPLE 5

A polycarbonate resin blend containing 20 weight percent glass fibers, 10 weight percent polytetrafluoroethylene, 0.1 weight percent methyl hydrogen silicone fluid, and 69.9 weight percent polycarbonate resin of Example 1 is injection molded into plaques and these plaques are then machined into test washers measuring about 1.12 inches in diameter and 0.12 inch in thickness. The wear factor K is determined for these washers and the results are set forth in Table I.

EXAMPLE 6

A polycarbonate resin blend containing 20 weight percent glass fibers, 4 weight percent linear low density polyethylene, 10 weight percent polytetrafluoroethylene, and 66 weight percent polycarbonate resin of Example 1 is injection molded into plaques and these plaques are machined into test washers measuring about 1.12 inches in diameter and 0.12 inch in thickness. The wear factor K is determined for these washers and the results are set forth in Table I.

EXAMPLE 7

A polycarbonate resin blend containing 20 weight percent glass fibers, 4 weight percent linear low density polyethylene, 15 weight percent polytetrafluoroethylene, and 61 weight percent polycarbonate resin of Example 1 is injection molded into plaques and these plaques are machined into test washers measuring about 1.12 inches in diameter and 0.12 inch in thickness. The wear factor K is determined for these washers and the results are set forth in Table I.

EXAMPLE 8

A polycarbonate resin blend containing 20 weight percent glass fibers, 10 weight percent linear low density polyethylene, 10 weight percent polytetrafluoroethylene, and 60 weight percent polycarbonate resin of Example 1 is injection molded into plaques and these plaques are machined into test washers measuring about 1.12 inches in diameter and 0.12 inch in thickness. The wear factor K is determined for these washers and the results are set forth in Table I.

The following example illustrates a composition of the instant invention.

EXAMPLE 9

A polycarbonate resin blend containing 20 weight percent glass fibers, 5 weight percent of polytetrafluoroethylene, 5 weight percent of linear low density polyethylene, 0.1 weight percent of methyl hydrogen silicone fluid, and 69.9 weight percent of polycarbonate resin of Example 1 is injection molded into test plaques and these test plaques are machined into test washers measuring 1.12 inches in diameter and 0.12 inch in thickness. The wear factor K is determined for these washers as set forth in Example 1 and the results are set forth in Table I.

TABLE I

| | Composition (wt. %) | | | | |
|---|---|---|---|---|---|
| Example No. | glass | polyolefin | polytetrafluoroethylene | silicone fluid | $K \times 10^{-10}$ in.$^3$ min/lb. ft. hr. |
| 1 | 0 | 0 | 0 | 0 | immediate failure |
| 2 | 20 | 0 | 0 | 0 | 4,900 |
| 3 | 20 | 4 | 0 | 0 | 1,100 |
| 4 | 20 | 0 | 10 | 0 | 850 |
| 5 | 20 | 0 | 10 | 0.1 | 310 |
| 6 | 20 | 4 | 10 | 0 | 195 |
| 7 | 20 | 4 | 15 | 0 | 178 |
| 8 | 20 | 10 | 10 | 0 | 200 |
| 9* | 20 | 5 | 5 | 0.1 | 120 |

*composition of the instant invention.

As illustrated by the data in Table I the particular combination of a polyolefin, a fluorinated polyolefin, and a silicone fluid of the instant invention (Example 9) provides polycarbonate compositions exhibiting improved wear resistance at reduced loadings of the polyolefin and fluorinated polyolefin. In order to obtain wear factors below 200 compositions which do not contain any silicone fluid need contain relatively high loadings of polyolefin and fluorinated polyolefin (Examples 6-8) compared with compositions which contain the silicone fluid (Example 9). A composition which contains a fluorinated polyolefin and a silicone fluid but no polyolefin (Example 5) has a wear factor more than twice as high as a composition which contains a polyolefin, a fluorinated polyolefin, and a silicone fluid (Example 9).

This data clearly illustrates the unexpected effect obtained by adding a relatively small amount of silicone fluid to blends containing both a polyolefin and a fluorinated polyolefin. The instant compositions exhibit better wear resistance at lower concentrations of polyolefin and fluorinated polyolefin. The instant three component, i.e., polyolefin, fluorinated polyolefin, and silicone fluid, containing compositions also exhibit much better wear resistance than compositions which contain the silicone fluid and either a polyolefin alone or a fluorinated polyolefin alone.

It will thus be seen that the objects set forth above, among those made apparent from the preceding description are efficiently attained, and since certain changes may be made in carrying out the above processes and compositions set forth without departing from the scope of the invention, it is intended that all matters contained in the above description be interperted as illustrative of the invention and not in a limiting sense.

What is claimed is:

1. An aromatic carbonate resin composition comprising:
   (i) at least one aromatic carbonate resin;
   (ii) at least one polyolefin;
   (iii) at least one fluorinated polyolefin; and
   (iv) at least one silcione fluid;
   components (ii)–(iv) being present in an amount effective to improve the wear resistance of said aromatic carbonate resin.

2. The composition of claim 1 which contains from about 0.01 to about 1.0 weight percent of said silicone fluid (iv).

3. The composition of claim 2 which contains from about 0.02 to about 0.8 weight percent of said silicone fluid (iv).

4. The composition of claim 3 which contains from about 0.05 to about 0.5 weight percent of said silicone fluid (iv).

5. The composition of claim 2 wherein said silicone fluid is methyl hydrogen polysiloxane.

6. The composition of claim 2 which contains from about 1 to about 12 weight percent of said polyolefin.

7. The composition of claim 6 which contains from about 2 to about 10 weight percent of said polyolefin.

8. The composition of claim 7 which contains from about 3 to about 7 weight percent of said polyolefin.

9. The composition of claim 5 wherein said polyolefin is linear low density polyethylene.

10. The composition of claim 2 which contains from about 1 to about 12 weight percent of said fluorinated polyolefin.

11. The composition of claim 10 which contains from about 2 to about 10 weight percent of said fluorinated polyolefin.

12. The composition of claim 11 which contains from about 3 to about 7 weight percent of said fluorinated polyolefin.

13. The composition of claim 10 wherein said fluorinated polyolefin is polytetrafluoroethylene.

14. The composition of claim 2 wherein said aromatic carbonate resin is an aromatic polycarbonate resin.

15. The composition of claim 14 wherein said aromatic carbonate resin is an aromatic copolyestercarbonate resin.

16. The composition of claim 2 which additionally contains glass filler.

17. The composition of claim 16 wherein said glass filler is glass fiber.

18. The composition of claim 17 which contains from about 1 to about 40 weight percent of said glass fiber.

19. The composition of claim 18 which contains from about 5 to about 35 weight percent glass fiber.

20. The composition of claim 17 which contains a flame retardant amount of at least one flame retardant compound.

21. The composition of claim 2 which contains a flame retardant amount of at least one flame retardant compound.

22. A glass filled aromatic carbonate resin composition comprising:
   (i) at least one aromatic carbonate resin;
   (ii) a glass filler;
   (iii) at least one polyolefin;
   (iv) at least one fluorinated polyolefin; and
   (v) at least one silicone fluid;
   components (iii)–(v) being present in an amount effective to improve the wear resistance of said glass filled aromatic carbonate resin.

23. The composition of claim 22 which contains from about 0.01 to about 1 weight percent of said silicone fluid.

24. The composition of claim 23 which contains from about 0.02 to about 0.8 weight percent of said silicone fluid.

25. The composition of claim 24 which contains from about 0.05 to about 0.5 weight percent of said silicone fluid.

26. The composition of claim 23 wherein said silicone fluid is methyl hydrogen polysiloxane.

27. The composition of claim 23 which contains from about 1 to about 12 weight percent of said polyolefin.

28. The composition of claim 27 which contains from about 2 to about 10 weight percent of said polyolefin.

29. The composition of claim 28 which contains from about 3 to about 7 weight percent of said polyolefin.

30. The composition of claim 29 wherein said polyolefin is linear low density polyethylene.

31. The composition of claim 23 which contains from about 1 to about 12 weight percent of fluorinated polyolefin.

32. The composition of claim 31 which contains from about 2 to about 10 weight percent of said fluorinated polyolefin.

33. The composition of claim 32 which contains from about 3 to about 7 weight percent of said fluorinated polyolefin.

34. The composition of claim 33 wherein said fluorinated polyolefin is polytetrafluoroethylene.

35. The composition of claim 22 wherein said glass filler is a glass fiber.

36. The composition of claim 35 which contains from about 1 to about 40 weight percent glass fiber.

37. The composition of claim 36 which contains from about 5 to about 35 weight percent glass fiber.

38. The composition of claim 37 which contains from about 10 to about 30 weight percent glass fiber.

39. The composition of claim 22 wherein said aromatic carbonate resin is a polycarbonate resin.

40. The composition of claim 22 wherein said aromatic carbonate resin is a copolyester-carbonate resin.

41. The composition of claim 22 which contains a flame retardant amount of at least one flame retardant compound.

* * * * *